Patented Apr. 9, 1940

2,196,907

UNITED STATES PATENT OFFICE 2,196,907

PREPARATION OF COMPOUNDS OF FLUORINE

Carl F. Swinehart, Cleveland Heights, Ohio, assignor to The Harshaw Chemical Company, Elyria, Ohio, a corporation of Ohio No Drawing. Application November 14, 1938, Serial No. 240,336

9 Claims. (Cl. 23—88)

This invention relates to the production of fluorine compounds and is a continuation-in-part of my copending application Serial No. 90,254, filed July 11, 1936, now Patent No. 2,148,514.

The object of the invention is to provide a novel and superior process for producing ammonium containing compounds with boron and fluorine in the ratio $BF_3$, and also for the production of $BF_3$.

Prior to my invention, $BF_3$ has been produced by reacting fluorspar, sulfuric acid and borax according to the equation:

$$6CaF_2 + 25H_2SO_4 + Na_2B_4O_7.10H_2O \rightarrow$$
$$2NaHSO_4 + 6CaSO_4 + 4BF_3 + 17H_2SO_4.H_2O$$

This reaction is characterized by the requirement of a high temperature and the formation of a troublesome retort residue. Also a large proportion (68%) of the sulfuric acid functions for binding the large amount of by-product water. This reaction, furthermore, does not go to completion but gives a yield of only about 30% in practice.

I have now discovered a process of producing $BF_3$ which can be carried out at relatively low temperature, forms no troublesome retort residues, forms a lesser amount of by-product water, and goes nearly to completion. My improved process consists in reacting together suitable materials capable of forming a desirable ammonium boron trifluoride complex, evaporating the reaction mixture to a solid state and reacting on the said complex remaining with sulfuric acid (preferably fuming).

A typical reaction illustrating my novel process may be written as follows:

(1) $6NH_4FHF + 4H_3BO_3 \rightarrow$
$(NH_4)_2O(BF_3)_4 + 4NH_3 + 11H_2O$ (2) $(NH_4)_2O(BF_3)_4 + 3H_2SO_4 \rightarrow$
$4BF_3 + 2NH_4HSO_4 + H_2SO_4.H_2O$ It will be observed that the amount of by-product water produced in Equation 1 is eleven mols as compared to 17 in the prior art reaction above noted. While this reduction in water content is important, it is a feature of greater importance that the process lends itself to the removal of most of the by-product water, before the addition of the sulfuric acid, by simple evaporation or equivalent manipulation. In Equation 2 it will be noted that only one mol of sulfuric acid is required to bind the by-product water for 4 mols of $BF_3$ as against 17 in the prior art process for the same amount of $BF_3$. Even this may be reduced by the use of fuming sulfuric acid. I may for example substitute for the $H_2SO_4$ in Equation 2 fuming sulfuric acid up to about 20% $SO_3$ concentration (20% oleum), thereby reducing the amount of by-product fluoxy-boric acid, a common impurity in $BF_3$.

In Equation 1, instead of $NH_4FHF$, I may use $NH_4F$ and $HF$, $NH_3$ and $HF$, or $NH_4OH$ and $HF$, and, in place of $H_3BO_3$, I may use other boric acids, e. g. $HBO_2$ or $B_2O_3$, in all cases adjusting the proportions so that there are 3 atoms of fluorine to one of boron. By the use of the term "boric acid" I intend to include $B_2O_3$, $HBO_2$ and $H_3BO_3$, and the other boric acids.

It has been known for some time (J. J. Berzelius, cited in Mellor 5, 125) that when 8 mols of ammonium fluoride are heated with 1 mol of boric oxide, 2 mols of ammonium fluoborate are formed, with liberation of ammonia and water, according to the following reaction:

$$8NH_4F + B_2O_3 \rightarrow 2NH_4BF_4 + 6NH_3 + 3H_2O$$

I have found however, that if instead of such ratio designated by Berzelius, there be reacted 12 mols of ammonium fluoride with 2 mols of boric oxide, ammonia and water are evolved, and there is produced what appears to be the novel compound $(NH_4)_2O(BF_3)_4$, this reaction being as follows:

$$12NH_4F + 2B_2O_3 \rightarrow (NH_4)_2O(BF_3)_4 + 10NH_3 + 5H_2O$$

I have found it more practical however, to prepare the novel compound by reacting 6 mols of ammonium bifluoride and 4 mols of boric acid, because in such reaction much less ammonia is evolved, and wasted, the reaction being as given in Equation 1.

In carrying out the process of Equation 1, I may drive off nearly all the $NH_3$ and $H_2O$, in which case the product should analyze about 84% $BF_3$. I find it more practical, however, to drive off less than all the $NH_3$ and $H_2O$ indicated by the equation and to make a product containing from 75% to 83% $BF_3$. I consider it within the scope of my invention to produce a product which is evaporated just enough to form a solid material and up to 84% $BF_3$. This would be, roughly, from about 70% to about 84% $BF_3$. Just what the state of combination of the elements contained in this composition may be, I do not know with certainty, and I therefore consider my invention to cover, in addition to the described process, the reaction product in the various stages of dessication, particularly when dessicated sufficiently to form a solid material, that is, from about 70% to 84% $BF_3$. The word "contain" is herein used in an inclusive sense and not to specify any state of physical or chemical combination.

The following specific examples will serve to illustrate the principles of the invention:

*Example I*

To 136 pounds of 99% $NH_4HF_2$ was added 100 pounds of boric acid. The charge became liquid at room temperature. The resulting liquid was evaporated to a sufficient state of dryness to permit screening, sufficient heat being applied to accomplish this result in about three hours. The yield was about 140 pounds of a product analyzing about 70% $BF_3$. The resulting product was treated with about three times its weight of 20% oleum, the $BF_3$ evolved being cooled to a dew point below $-40°$ C. at atmospheric pressure and compressed into cylinders for shipment.

*Example II*

To 141 pounds of 95% $NH_4HF_2$ was added 100 pounds of boric acid. The charge became liquid at room temperature. The resulting liquid was evaporated to a sufficient state of dryness to permit screening, sufficient heat being applied to accomplish this result in about three hours. The yield was about 145 pounds of a product analyzing about 70% $BF_3$. The resulting product was treated with about three times its weight of 20% oleum, the $BF_3$ evolved being cooled to a dew point of below $-40°$ C. at atmospheric pressure and compressed into cylinders for shipment.

*Example III*

Example I was varied by evaporating further until the product yielded about 130 pounds of material showing on analysis about 75% $BF_3$.

By repeated additions of water and evaporation, the $BF_3$ content may be raised to almost the theoretical value for the compound $(NH_4)_2O(BF_3)_4$.

The cooling of the $BF_3$ product prior to compression effects removal of constituents which interfere with compression, particularly fluoxyboric acid.

Having thus described my invention, what I claim is:

1. A new composition of matter containing the elements $NH_3$, $H_2O$ and $BF_3$, in the probable form of a mixture of $(NH_4)_2O(BF_3)_4$, $NH_3$ and $H_2O$, the same being a solid material at room temperature and containing boron and fluorine in amount and proportion approximately corresponding to 70% to 84% $BF_3$.

2. Process comprising reacting ammonium bifluoride with boric acid, the proportions being such as to provide approximately one atom of boron for each three atoms of fluorine.

3. Process comprising reacting ammonium bifluoride with boric acid, the proportions being such as to provide approximately one atom of boron for each three atoms of fluorine and evaporating the reaction mixture to a solid state.

4. Process comprising reacting ammonium bifluoride with boric acid, the proportions being such as to provide approximately one atom of boron for each three atoms of fluorine and evaporating the reaction mixture to a $BF_3$ content of from 70% to 84% by weight.

5. A new composition of matter comprising $(NH_4)_2O(BF_3)_4$.

6. A new composition of matter, being a reaction product of an ammonium fluorine material and a boric acid material, being solid at room temperature and yielding on analysis boron and fluorine corresponding to a $BF_3$ content of from 70% to 84% and capable of yielding $BF_3$ upon treatment with sulfuric acid.

7. In the preparation of compounds of fluorine, reacting slightly more than 4 mols of boric acid with 6 mols of ammonium bifluoride, heating to evolve water and ammonia from the reaction product, then reacting upon the product with sulphuric acid, cooling the boron fluoride resultant, and compressing.

8. In the preparation of compounds of fluorine, reacting slightly more than four mols of boric acid with six mols of ammonium bifluoride, heating to evolve water and ammonia from the reaction product, then reacting the product with sulphuric acid, cooling the boron fluoride resultant to a temperature below minus 40° C. to reduce the moisture content to the saturation value for water vapor at that temperature at one atmosphere pressure and compressing into a suitable container.

9. A new composition of matter, being a reaction product of an ammonium fluorine material and a boric acid material, containing boron and fluorine in approximately the ratio $BF_3$ but containing at least as much boron as represented by that ratio, the said reaction product being solid at room temperature and yielding on analysis boron and fluorine in quantity corresponding to a $BF_3$ content of approximately 75% and capable of yielding $BF_3$ upon treatment with sulfuric acid.

CARL F. SWINEHART.